(12) United States Patent
Kowaka et al.

(10) Patent No.: US 9,396,318 B2
(45) Date of Patent: Jul. 19, 2016

(54) PASSWORD AUTHENTICATION APPARATUS, PASSWORD AUTHENTICATION METHOD, AND NON-TRANSITORY COMPUTER-READABLE RECORDING MEDIUM STORING PASSWORD AUTHENTICATION PROGRAM

(71) Applicant: KYOCERA Document Solutions Inc.

(72) Inventors: Makoto Kowaka, Osaka (JP); Yosuke Nakazato, Osaka (JP); Yoshitaka Matsuki, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 14/768,537

(22) PCT Filed: Sep. 11, 2014

(86) PCT No.: PCT/JP2014/074140
§ 371 (c)(1),
(2) Date: Aug. 18, 2015

(87) PCT Pub. No.: WO2015/064229
PCT Pub. Date: May 7, 2015

(65) Prior Publication Data
US 2016/0004854 A1 Jan. 7, 2016

(30) Foreign Application Priority Data

Oct. 29, 2013 (JP) .................................. 2013-224745

(51) Int. Cl.
G06F 21/00 (2013.01)
G06F 21/31 (2013.01)
G06F 21/36 (2013.01)
H04L 29/06 (2006.01)

(52) U.S. Cl.
CPC .............. *G06F 21/316* (2013.01); *G06F 21/36* (2013.01); *H04L 63/0838* (2013.01)

(58) Field of Classification Search
None
See application file for complete search history.

(56) References Cited

U.S. PATENT DOCUMENTS

| | | | |
|---|---|---|---|
| 9,111,073 B1 * | 8/2015 | Jiang | G06F 21/36 |
| 2002/0109677 A1 * | 8/2002 | Taylor | G06F 3/0233 345/173 |
| 2008/0301462 A1 * | 12/2008 | Dayan | G06F 21/31 713/184 |

(Continued)

FOREIGN PATENT DOCUMENTS

| | | |
|---|---|---|
| JP | 2008-234440 | 10/2008 |
| JP | 2009-301208 | 12/2009 |

(Continued)

*Primary Examiner* — Hadi Armouche
*Assistant Examiner* — Andrew Steinle

(57) ABSTRACT

A control unit makes a screen of a display unit display a plurality of pattern display areas to which a predetermined respective plurality of patterns are uniquely assigned at random as a pattern random array in the same layout as that of a plurality of input keys capable of inputting numerical values. The control unit determines a shortest path to go through a sequence of patterns serving as a password of a user in the pattern random array, and replaces a sequence of all patterns existing on the shortest path with a sequence of codes assigned to the respective plurality of input buttons according to a correspondence relationship between the plurality of input buttons and the plurality of pattern display areas to generate a one-time password. The control unit then compares the one-time password with a sequence of codes input by the user by using an input unit to perform authentication.

4 Claims, 12 Drawing Sheets

(56) References Cited

U.S. PATENT DOCUMENTS

2013/0268775 A1* 10/2013 Hawkins .............. G06F 21/64
 713/189
2014/0013408 A1* 1/2014 Ryu ..................... G06F 21/36
 726/7

FOREIGN PATENT DOCUMENTS

| JP | 2012-194648 | 10/2012 |
|----|-------------|---------|
| JP | 2013-022089 | 2/2013 |
| JP | 2013-131150 | 7/2013 |

* cited by examiner

SEQUENCE OF PASSWORD: R→G→B
PASSWORD PATH SEQUENCE: R→M→G→Gray→B
ONE-TIME PASSWORD: 1→4→7→8→9

SEQUENCE OF PASSWORD: R→G→B
PASSWORD PATH SEQUENCE: R→B→Gray→G→Gray→B
ONE-TIME PASSWORD: 6→3→2→1→2→3

SEQUENCE OF PASSWORD: R→G→B
PASSWORD PATH SEQUENCE: R→Y→M→G→Gray→B
ONE-TIME PASSWORD: 6→5→4→1→2→3

SEQUENCE OF PASSWORD: R→G→B

PASSWORD PATH SEQUENCE: R→W→G→M→C→B

ONE-TIME PASSWORD: 5→2→1→4→7→8

SEQUENCE OF PASSWORD: R→G→B
PASSWORD PATH SEQUENCE: R→K→M→Gray→B→Y→G→Y→B
ONE-TIME PASSWORD: 2→3→4→5→6→7→8→7→6

SEQUENCE OF PASSWORD: R→G→B
PASSWORD PATH SEQUENCE: R→C→G→Y→B
ONE-TIME PASSWORD: 2→1→8→7→6

PASSWORD AUTHENTICATION APPARATUS, PASSWORD AUTHENTICATION METHOD, AND NON-TRANSITORY COMPUTER-READABLE RECORDING MEDIUM STORING PASSWORD AUTHENTICATION PROGRAM

TECHNICAL FIELD

The present invention relates to a password authentication apparatus, a password authentication method, and a non-transitory computer-readable recording medium storing a password authentication program.

BACKGROUND ART

When using a service on the web, a bank service, or the like by using a mobile terminal or an ATM (Automatic Teller Machine), password authentication for identification is performed. The password authentication requires measures against password leakage due to shoulder surfing, secret photography, and the like at the scene of an input operation of a password.

Various techniques for preventing password leakage due to shoulder surfing and secret photography have been known. As one of such techniques, Patent Literature 1 discloses the following. A hiragana table capable of selectively inputting characters is displayed on an authentication terminal (ATM main body). Meanwhile, a correspondence table for associating characters with numerals is transmitted from the authentication terminal to the user's mobile terminal. The user enters a character string corresponding to a password (numeric string) into the authentication terminal by referring to the correspondence table on the mobile terminal. This can reduce the risk of the occurrence of password leakage as compared to a method for directly entering the password.

In Patent Literature 2, a plurality of button images to which numerical values of 0 to 9 are assigned at random are displayed on a display of a TV set. The plurality of button images are displayed in the same layout as that of a plurality of numeric keys of a remote controller to which numerals of 0 to 9 are assigned in a fixed manner. Instead of entering numerical values of a password itself from the remote controller, the user checks the positions of the button images to which the respective numerical values constituting the user's password are assigned on the arrangement of the plurality of button images displayed on the display of the TV set, and operates the numeric keys of the remote controller lying in the same positions. This is said to be able to prevent leakage of the password occurring because the plurality of numeric keys operated on the remote controller and the order of operation are visually observed by a third party.

CITATION LIST

Patent Literature

Patent Literature 1: Japanese Patent Application Laid-Open No. 2008-234440
Patent Literature 2: Japanese Patent Application Laid-Open No. 2009-301208

SUMMARY OF INVENTION

Technical Problem

However, according to the technique disclosed in the foregoing Patent Literature 1, the user himself/herself needs to refer to the correspondence table and convert the password into hiragana characters one by one. This requires labor and time for operation. In particular, re-entry of the password due to a conversion error is likely to occur. In addition, since the correspondence table needs to be transmitted from the authentication terminal to the user's mobile terminal, a communication trouble can make the entry of the password impossible.

According to the technique disclosed in Patent Literature 2, the numerals constituting the password can be input from the remote controller by using different numerical values. The password therefore will not leak simply by the input operation to the remote controller being shoulder surfed. However, there is a risk of password theft by a third party who can shoulder surf both the input operation to the remote controller and the display at the same time.

In view of the foregoing circumstances, an object of the present invention is to provide a password authentication apparatus, a password authentication method, and a non-transitory computer-readable recording medium storing a password authentication program which can more firmly prevent password leakage.

Solution to Problem

A password authentication apparatus according to an aspect of the present invention includes: an input unit including a plurality of input keys to which respective unique codes are assigned and that are arranged in a specific layout; a display unit on which a plurality of pattern display areas to which for a respective plurality of patterns to be uniquely assigned at random are displayed as a pattern random array in a layout corresponding to the layout of the plurality of input keys in the input unit; a storage unit that stores a sequence of the patterns registered as a password of each user to be authenticated; and a control unit that uniquely assigns the plurality of patterns to the plurality of pattern display areas at random and makes the display unit display the pattern random array, determines a shortest path to go through the sequence of the patterns serving as the password of the user to be authenticated in the pattern random array, replaces a sequence of all patterns existing on the shortest path with a sequence of the codes assigned to the respective plurality of input keys according to a correspondence relationship between the plurality of input keys and the plurality of pattern display areas to generate a one-time password, and compares the one-time password with a sequence of codes input by using the input unit to perform authentication.

A password authentication method according to an aspect of the present invention includes: preparing an input unit including a plurality of input keys to which respective unique codes are assigned and that are arranged in a specific layout, and a display unit on which a plurality of pattern display areas to which for a respective plurality of patterns to be uniquely assigned at random are displayed as a pattern random array in a layout corresponding to the layout of the plurality of input keys in the input unit; uniquely assigning the plurality of patterns to the plurality of pattern display areas at random and making the display unit display the pattern random array; determining a shortest path to go through a sequence of the patterns serving as a password of the user to be authenticated in the pattern random array; replacing a sequence of all patterns existing on the shortest path with a sequence of the codes assigned to the respective plurality of input keys according to a correspondence relationship between the plurality of input keys and the plurality of pattern display areas to generate a one-time password; and comparing the one-time password with a sequence of codes input by using the input unit to perform authentication.

A non-transitory computer-readable recording medium according to an aspect of the present invention stores a password authentication program. The password authentication program causes a computer to function as a control unit that, by using an input unit including a plurality of input keys to which respective unique codes are assigned and that are arranged in a specific layout, a display unit on which a plurality of pattern display areas to which for a respective plurality of types of patterns to be uniquely assigned at random are displayed as a pattern random array in a layout corresponding to the layout of the plurality of input keys in the input unit, and a storage unit that stores a sequence of the patterns registered as a password of each user to be authenticated, uniquely assigns the plurality of patterns to the plurality of pattern display areas at random and makes the display unit display the pattern random array, determines a shortest path to go through the sequence of the patterns serving as the password of the user to be authenticated in the pattern random array, replaces a sequence of all patterns existing on the shortest path with a sequence of the codes assigned to the respective plurality of input keys according to a correspondence relationship between the plurality of input keys and the plurality of pattern display areas to generate a one-time password, and compares the one-time password with a sequence of codes input by using the input unit to perform authentication.

Advantageous Effects of Invention

As described above, according to the present invention, password leakage can be more firmly prevented.

DESCRIPTION OF EMBODIMENTS

An embodiment of the present invention will be described below with reference to the drawings.

Figure 1:
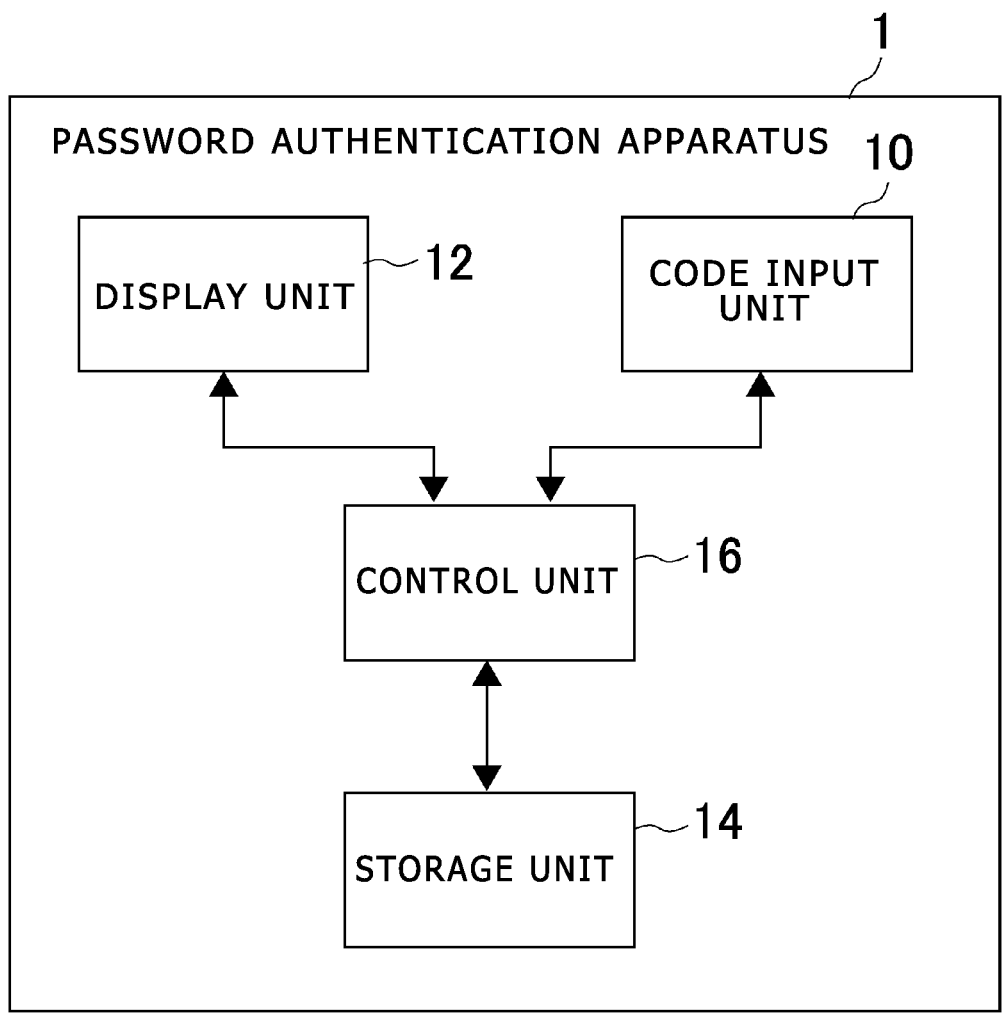
FIG. 1 is a block diagram showing a configuration of a password authentication apparatus according to an embodiment of the present invention.

FIG. 1 is a block diagram showing a configuration of a password authentication apparatus according to an embodiment of the present invention. As shown in FIG. 1, the password authentication apparatus 1 includes a code input unit 10, a display unit 12, a storage unit 14, and a control unit 16.

The code input unit 10 is a device that accepts an input from a user to be authenticated. The display unit 12 is a device that displays various types of information to be presented to the user. For example, the code input unit 10 and the display unit 12 may be configured as a display with a touch sensor panel or the like. Alternatively, the code input unit 10 and the display unit 12 may be provided as separate devices. For example, the code input unit 10 may be a dedicated input device such as a keyboard. The display unit 12 may be a display-only device.

Figure 2:
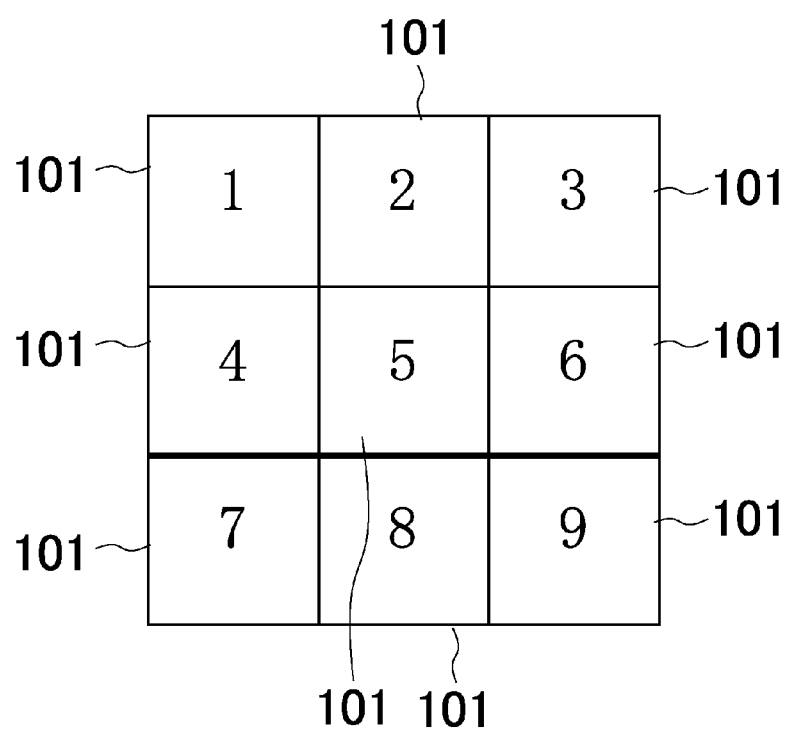
FIG. 2 is a diagram showing a layout of input keys.

The code input unit 10 includes a plurality of input keys. FIG. 2 is a diagram showing the layout of input keys 101 in the code input unit 10. A total of nine types of codes, such as numerical values of 1 to 9, are assigned to the respective input keys 101 in a fixed manner. The assigned numerical values are written on the respective input keys 101 so that the user can visually identify the numerical values. The input keys 101 have the same shape and size. The code input unit 10 is configured to be able to detect an input key 101 operated by the user and output the code (numerical value) assigned to the detected input key 101 to the control unit 16.

The display unit 12 includes a display screen. The display screen displays a pattern random array that is needed for the user to input a one-time password at the time of user authentication.

Figure 3:
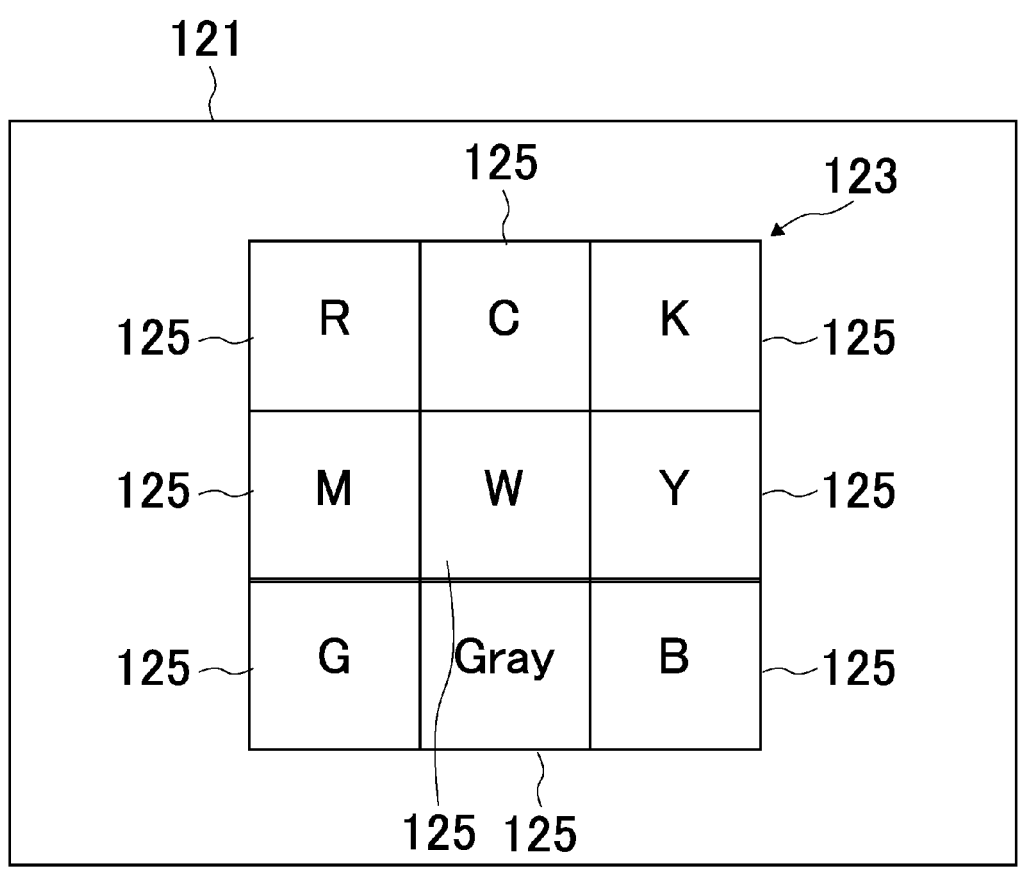
FIG. 3 is a diagram showing a configuration of a pattern random array.

FIG. 3 is a diagram showing a configuration of a pattern random array 123 displayed on a display screen 121 of the display unit 12. As shown in the diagram, the pattern random array 123 includes a plurality of pattern display areas 125 which are arranged in a layout corresponding to that of the plurality of input keys 101 in the code input unit 10. The pattern display areas 125 have the same shape and size.

As shown in FIGS. 2 and 3, both the nine input keys 101 of the code input unit 10 and the nine pattern display areas 125 of the pattern random array 123 are arranged in a 3-row by 3-column two-dimensional array. The respective input keys 101 of the code input unit 10 and the respective pattern display areas 125 of the pattern random array 123 have a one-to-one correspondence relationship. The control unit 16 retains information about such a correspondence relationship. While a 3-row by 3-column two-dimensional array is described here as an example, an n-row by m-column one (both n and m are integers of two or more) may be used, such as 2-row by 3-column, 4-row by 3-column, and 3-row by 4-column.

As shown in FIG. 3, a predetermined plurality of types of patterns are uniquely assigned to at random and displayed on the respective pattern display areas 125 of the pattern random array 123 under control of the control unit 16. In the present embodiment, colors are used as the patterns. As employed herein, "random" refers to being random upon each round of authentication processing. "Uniquely" refers to that nine types of patterns (colors) are assigned to the nine display areas on a one-on-one basis so that a plurality of pattern display areas 125 do not simultaneously display the same type of pattern (color). In FIG. 3, R represents red, C cyan, K black (key plate), M magenta, W white, Y yellow, G green, Gray gray, and B blue.

The storage unit 14 stores, for example, a password previously registered by each user as being linked with a user ID. The user ID is information for identifying the user. The password is set as a sequence of a plurality of patterns. That is, the user registers a password not as a sequence of numerical values but as a sequence of patterns. In terms of handleability of the password by the user, it is important for the patterns to have high visibility. In such a sense, the use of "colors" as examples of the patterns is desirable. Colors are also suitable for the user to remember the password. The storage unit 14 is desirably a nonvolatile memory.

The control unit 16, to be more specific, is a controller which includes a CPU (Central Processing Unit) and a RAM (Random Access Memory) used as a main memory.

The control unit 16 includes a computer, and performs control and arithmetic processing related to user authentication to be described below according to a password authentication program. The password authentication program is stored in a non-transitory computer-readable recording medium, and is read and executed by the computer of the control unit 16. As the control and arithmetic processing related to the user authentication, the control unit 16 uniquely assigns the plurality of types of patterns to the plurality of pattern display areas 125 of the display unit at random and makes the plurality of pattern display areas 125 display the respective patterns. The control unit 16 refers to the storage unit 14 for a sequence of patterns serving as the password of the user to be authenticated, and determines a sequence of all patterns existing on a shortest path to go through the referred sequence of patterns in the pattern random array 123 as a password path sequence. The control unit 16 replaces the password path sequence with a sequence of the codes (numerical values) assigned to the respective input keys 101 of the code input unit 101 according to the one-to-one correspondence relationship between the plurality of keys 101 and the plurality of pattern display areas 125 of the pattern random array 123, thereby generating a one-time password. The control unit 16 then compares the one-time password with a sequence of codes (numerical values) input by the user by using the code input unit 10 to perform user authentication.

[Operation of Password Authentication Apparatus]

Figure 4:
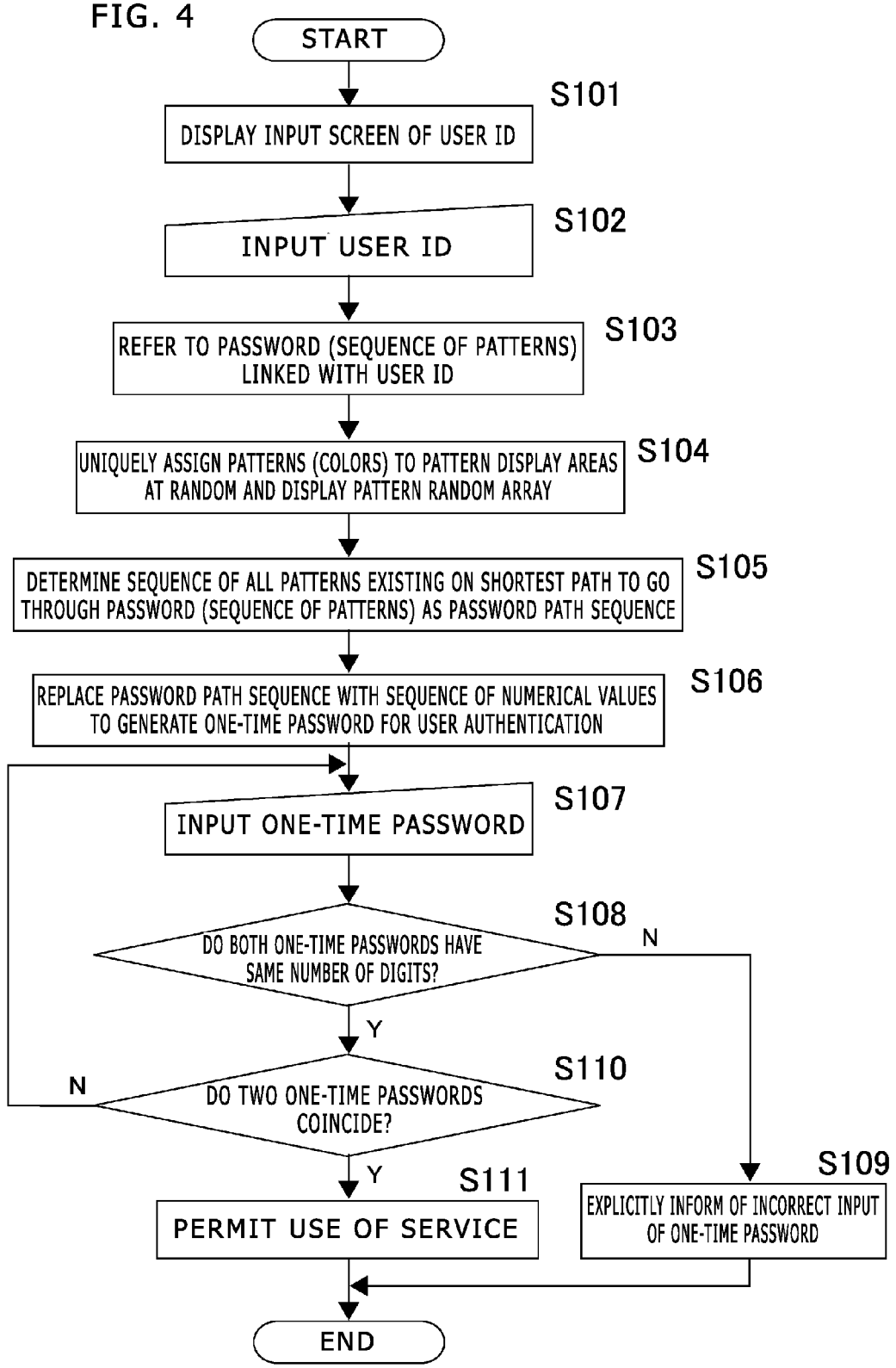
FIG. 4 is a flowchart showing a procedure of password authentication processing by the password authentication apparatus of FIG. 1.

Next, an operation of the password authentication apparatus 1 according to the present embodiment will be described. FIG. 4 is a flowchart showing a procedure of password authentication processing by the password authentication apparatus 1.

Figure 5:
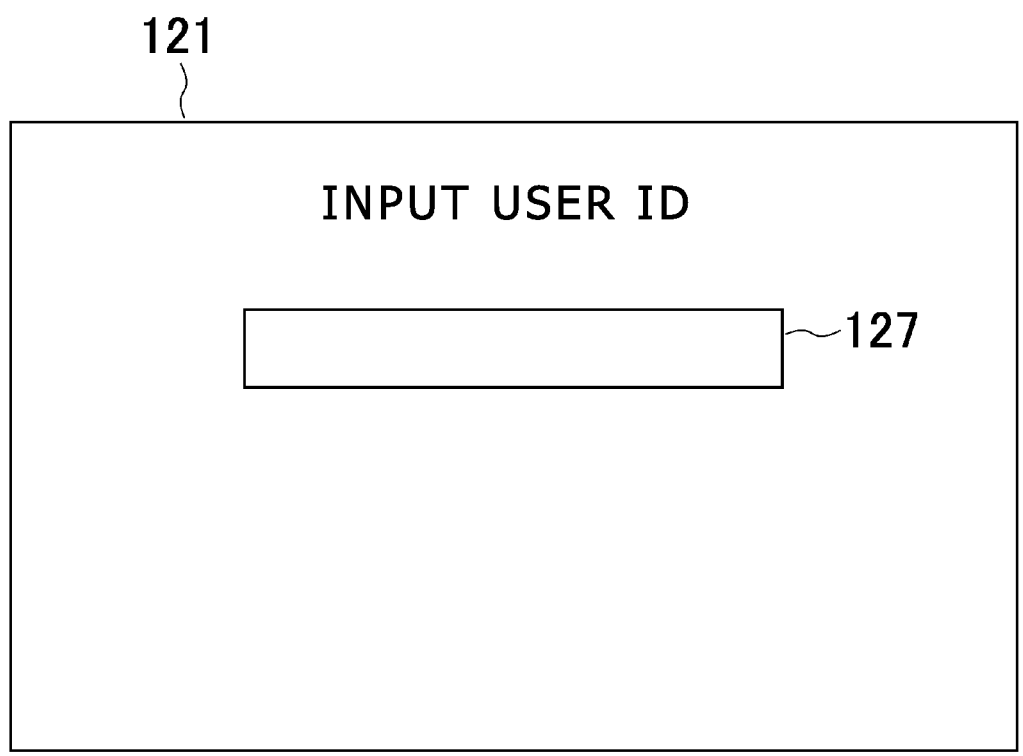
FIG. 5 is a diagram showing an input screen of a user ID.

The control unit 16 initially performs control to make the display screen 121 of the display unit 12 display an input screen of a user ID (see FIG. 5) (step S101). The input screen of a user ID includes an input box 127 of a user ID. The user operates the code input unit 10 to input the user's own user ID into the input box 127 (step S102). The user ID input into the input box 127 is identified by the control unit 16. The control unit 16 refers to a sequence of patterns that is the password registered in the storage unit 14 as being linked with the identified user ID (step S103).

Next, the control unit 16 uniquely assigns the nine types of colors to the plurality of pattern display areas 125 of the display unit 12 at random and makes the plurality of pattern display areas 125 display the respective colors to generate a pattern random array 123 (step S104). In other words, the assignment of the nine types of colors to the plurality of pattern display areas 125 is reset and a pattern random array 123 is generated in each cycle of user authentication.

Next, the control unit 16 determines a sequence of all patterns existing on a shortest path to go through the sequence of patterns having been referred to in the storage unit 14, serving as the user's password, in the pattern random array 123 as a password path sequence (step S105).

Rules for going through a shortest path on the pattern random array 123 include which to give priority to, vertical or horizontal moves. In the present embodiment, priority is given to vertical moves. The rules for going through a shortest path will be described in detail later.

The control unit 16 further replaces the password path sequence with a sequence of the codes (numerical values) of 1 to 9 assigned to the respective input keys 101 of the code input unit 10 according to the one-to-one correspondence relationship between the plurality of input keys 101 and the plurality of pattern display areas 125 of the pattern random array 123. The control unit 16 thereby generates and retains a one-time password (step S106).

Now, the determination of the password path sequence and the generation of the one-time password will be described by using specific examples.

Figure 6A:
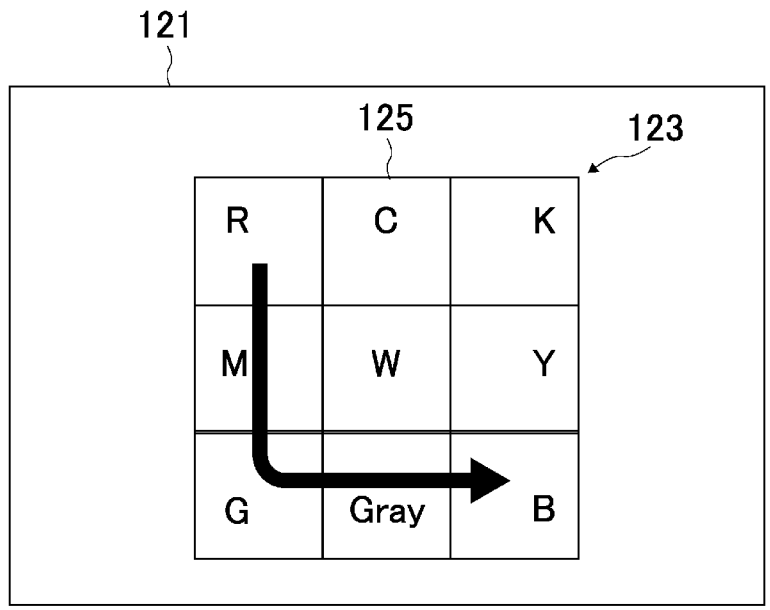
FIG. 6A is a diagram showing an example of the pattern random array and a password path sequence.
Figure 6B:
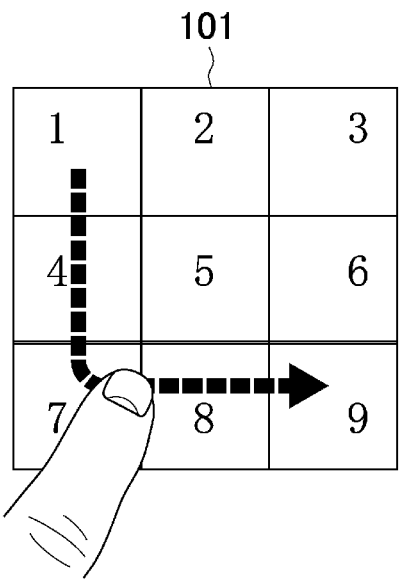
FIG. 6B is a diagram showing an input example of a one-time password corresponding to the password path sequence of FIG. 6A.

FIGS. 6A and 6B are diagrams showing a first specific example of the determination of the password path sequence and the generation of the one-time password. Suppose that the sequence of patterns serving as a password is R→G→B. The password path sequence, a sequence of all patterns existing on the shortest path to go through the sequence of patterns, is R→M→G→Gray→B. Replacing such a password path sequence with a sequence of the numerical values of 1 to 9 assigned to the respective input keys 101 of the code input unit 10 according to the one-to-one correspondence relationship between the input keys 101 and the pattern display areas 125 of the pattern random array 123 results in 1→4→7→8→9. This sequence of numerical values is the one-time password for the current user authentication.

Return to the description of the user authentication processing in FIG. 4. The control unit 16 then displays a guiding message like "Select the shortest path to go through the sequence of colors that is your password by using the input keys 101" on the display screen 121 of the display unit 12 to prompt the user to input a one-time password. The user finds out the sequence of patterns serving as his/her own password from the plurality of pattern display areas 125 of the pattern random array 123, determines the shortest path to go through the sequence of patterns, and selects the shortest path by using the input keys 101 to input the one-time password (step S107).

The control unit 16 compares the one-time password generated for the current user authentication with the one-time password input by the user via the code input unit 10. For the comparison, the control unit 16 initially compares the numbers of digits (step S108). For example, if an incorrect shortest path is selected by the user, the numbers of digits can be different. If the numbers of digits of the two one-time passwords thus fail to coincide, for example, the control unit 16 explicitly informs the user of the incorrect input of the one-time password via the display screen 121 of the display unit 12 (step S109).

If the numbers of digits of the two one-time passwords coincide, the control unit 16 then determines whether the two one-time passwords coincide with each other (step S110). If the two one-time passwords do not coincide, the control unit 16 returns to step S107 to prompt the user to input a one-time password again, and waits for the input of the one-time password. If the two one-time passwords coincide (Y in step S110), the control unit 16 settles the success of the user authentication and performs control to permit the use of a service (step S111).

Possible examples of the case where the one-time password generated for user authentication and the one-time password input by the user have the same number of digits but the one-time passwords themselves do not coincide with each other may include the following. That is, if the user successfully finds out a shortest path on the pattern random array 123 and there are a plurality of shortest paths, the user may select an incorrect shortest path, forgetting the rule about the priority between vertical and horizontal moves for path selection. In such a case, the user is aware of the presence of another shortest path. Given the chance to enter a one-time password again, the user can thus immediately select the other shortest path by using the input keys 101 to re-enter the one-time password.

Figure 7A:
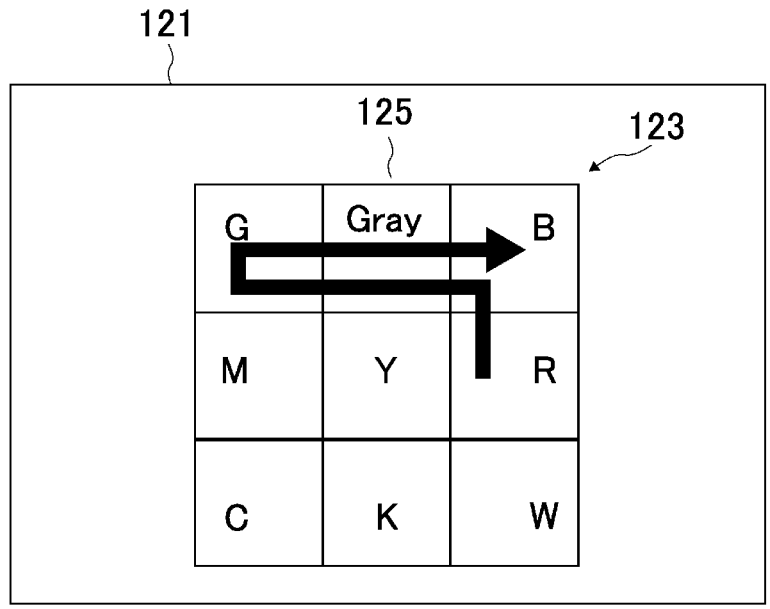
FIG. 7A is a diagram showing another example of the pattern random array and the password path sequence.
Figure 7B:
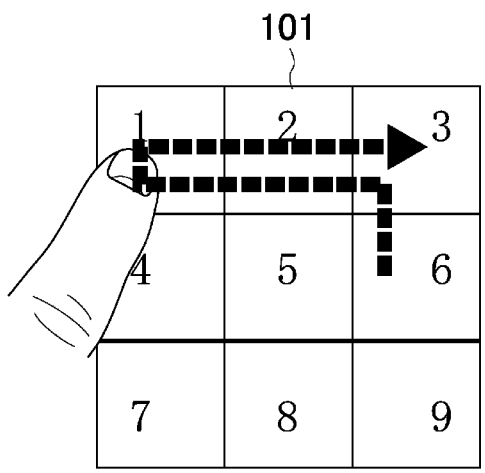
FIG. 7B is a diagram showing an input example of a one-time password corresponding to the password path sequence of FIG. 7A.

If the same user performs user authentication next time, the assignment of the patterns (colors) to the pattern display areas 125 of the pattern random array 123 is randomly generated again. FIGS. 7A and 7B are diagrams showing an example of the pattern random array 123 generated for another round of user authentication by the same user.

The sequence of patterns serving as the password is R→G→B again. With priority given to vertical moves, the password path sequence, a sequence of all patterns existing on the shortest path to go through the sequence of patterns, is R→B→Gray→G→Gray→B.

Replacing such a password path sequence with a sequence of the numerical values of 1 to 9 assigned to the respective input keys 101 of the code input unit 10 according to the one-to-one correspondence relationship between the input keys 101 and the pattern display areas 125 of the pattern random array 123 results in 6→3→2→1→2→3. This sequence of numerical values is the one-time password for the current user authentication. In such a manner, the one-time password different from the one-time password for the previous user authentication (1→4→7→8→9) is generated.

Figure 8:
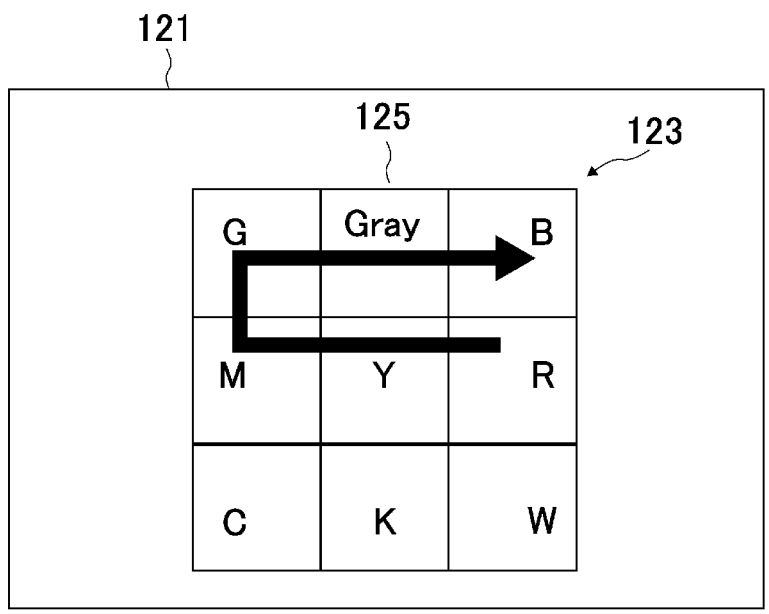
FIG. 8 is a diagram showing another password path sequence for the pattern random array of FIG. 7A.

The rules for going through a shortest path of a sequence of patterns have been described to include which to give priority to, vertical or horizontal moves. The specific example of the pattern random array 123 of FIG. 7A is an example for illustrating the meaning of the rule. More specifically, there are two shortest paths in the pattern random array 123 of FIG. 7A if the rule for going through a shortest path is ignored. One is R→B→Gray→G→Gray→B (FIG. 7A), which is obtained if priority is given to vertical moves. As shown in FIG. 8, the other is R→Y→M→G→Gray→B, which is obtained if priority is given to horizontal moves. To use a single one-time password for user authentication, the rule about which to give priority to, vertical or horizontal moves, needs to be given to the control unit 16 and the user in advance.

The shortest path R∝B→Gray→G→Gray∝B obtained when priority is given to vertical moves and the shortest path R→Y→M→G→Gray→B obtained when priority is given to horizontal moves may be both handled as one-time passwords for user authentication.

Figure 9A:
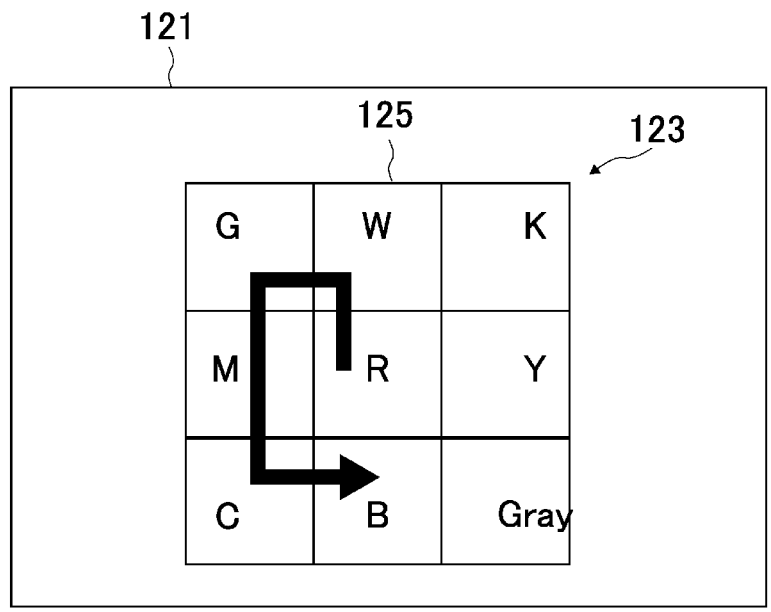
FIG. 9A is a diagram showing yet another example of the pattern random array and the password path sequence.
Figure 9B:
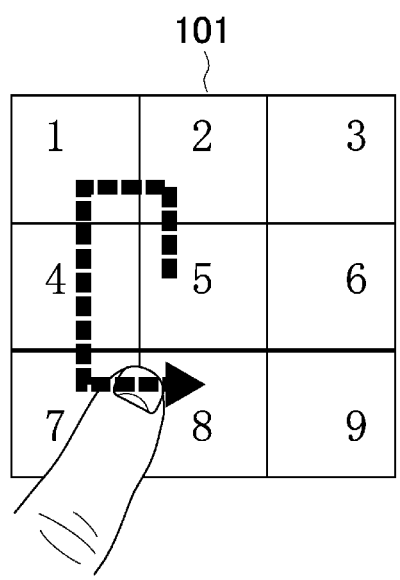
FIG. 9B is a diagram showing an input example of a one-time password corresponding to the password path sequence of FIG. 9A.

FIGS. 9A and 9B are diagrams showing an example of the pattern random array 123 generated in yet another round of user authentication by the same user. The sequence of patterns serving as the password is R→G→B again. With priority given to vertical moves, the password path sequence, a sequence of all patterns existing on the shortest path to go through the sequence of patterns, is R→W→G→M→C→B.

Replacing such a password path sequence with a sequence of the numerical values of 1 to 9 assigned to the respective input keys 101 of the code input unit 10 according to the one-to-one correspondence relationship between the input keys 101 and the pattern display areas 125 of the pattern random array 123 results in 5→2→1→4→7→8. This sequence of numerical values is the one-time password for the current user authentication. In such a manner, the one-time password different from the one-time password at the time of the last but one user authentication (1→4→7→8→9) and the one-time password at the time of the last user authentication (6→3→2→1→2→3) is generated.

[Effect and Like of Password Authentication Apparatus of Present Embodiment]

As described above, the user finds out a sequence of all patterns existing on the shortest path to go through the sequence of patterns serving as his/her own password in the pattern random array 123 displayed on the display screen 121 of the display unit 12. The user operates the input keys 101 of the code input unit 10 to input a sequence of numerical values positionally corresponding to the password path sequence as a one-time password.

Here, the pattern random array 123 is generated at random in each round of user authentication. Even if a third party can shoulder surf the operation for inputting the password into the code input unit 10, the third party is therefore not able to conduct impersonation by using the password. The input of the password into the code input unit 10 is performed by operating a plurality of input keys corresponding to the password path sequence which is the shortest path to go through the sequence of patterns serving as the own password in the pattern random array 123. The sequence of patterns that is the actual password is therefore less likely to be estimated by a third party. As a result, the security of the user authentication improves.

<Modification 1>

Figure 10A:
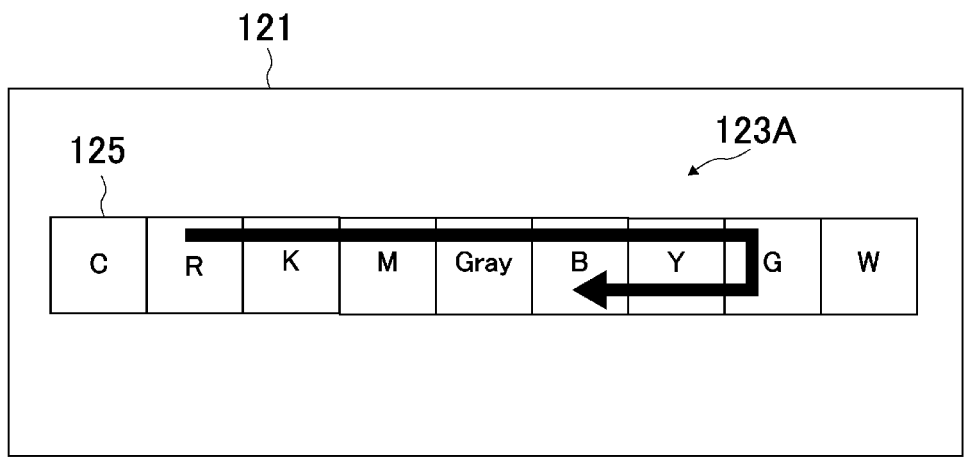
FIG. 10A is a diagram showing an example of a pattern random array and a password path sequence of modification 1.
Figure 10B:
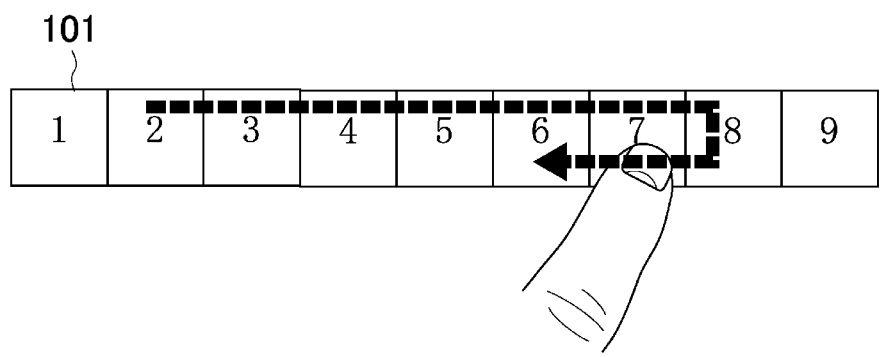
FIG. 10B is a diagram showing an input example of a one-time password corresponding to the password path sequence of modification 1.

In the foregoing embodiment, a 3-row by 3-column two-dimensional array is employed as the pattern random array 123. However, the present invention is not limited thereto. For example, as shown in FIGS. 10A and 10B, a one-dimensional (one-row) pattern random array 123A may be employed.

Suppose, for example, that the sequence of patterns serving as the password is R→G→B. The password path sequence, a sequence of all patterns existing on the shortest path to go through the sequence of patterns, is R→K→M→Gray→B→Y→G→Y→B.

Replacing such a password path sequence with a sequence of the numerical values of 1 to 9 assigned to the respective input keys 101 of the code input unit 10 according to a one-to-one correspondence relationship between the input keys 101 and the pattern display areas 125 of the pattern random array 123A based on the layout results in 2→3→4→5→6→7→8→7→6. This sequence of numerical values is the correct one-time password for the current user authentication.

<Modification 2>

Figure 11A:
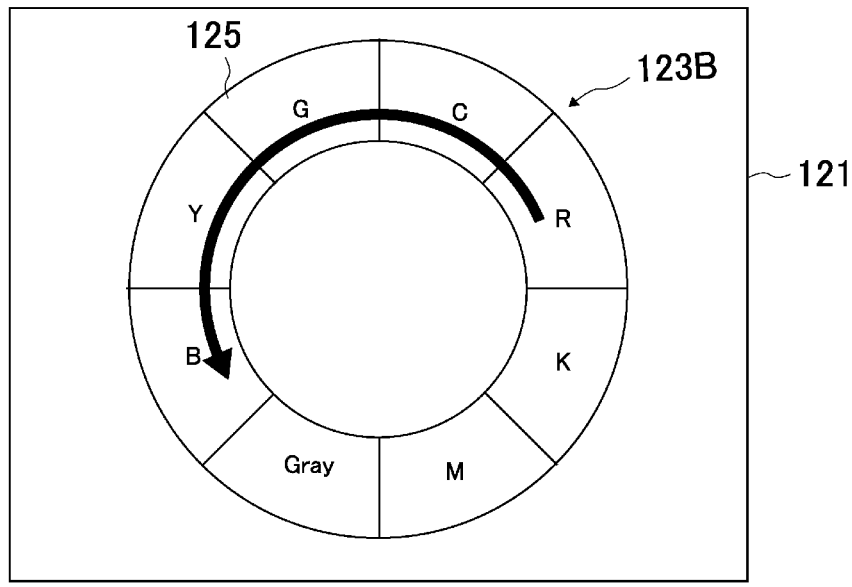
FIG. 11A is a diagram showing an example of a pattern random array and a password path sequence of modification 2.
Figure 11B:
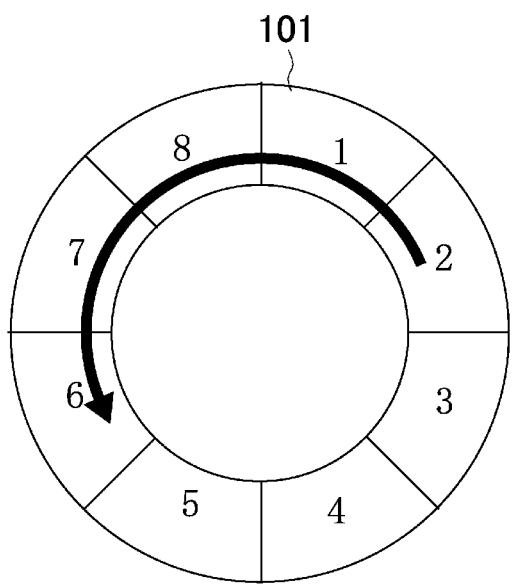
FIG. 11B is a diagram showing an input example of a one-time password corresponding to the password path sequence of modification 2.

Other examples of the one-dimensional pattern random array 123 may include a tube-like pattern random array 123B as shown in FIGS. 11A and 11B. In the example shown in FIGS. 11A and 11B, suppose that the sequence of patterns serving as the password is R→G→B. In the present modification 2, priority is set between a clockwise direction and a counterclockwise direction. Suppose that higher priority is given to the counterclockwise direction. With priority given to the counterclockwise direction, the password path sequence, a sequence of all patterns existing on the shortest path to go through the sequence of patterns, is R→C→G→Y→B.

Replacing such a password path sequence with a sequence of the numerical values of 1 to 9 assigned to the respective input keys 101 of the code input unit 10 according to a one-to-one correspondence relationship between the input keys 101 and the pattern display areas 125 of the pattern random array 123B based on the layout results in 2→1→8→7→6. This sequence of numerical values is the correct one-time password for the current user authentication.

<Modification 3>

Figure 12:
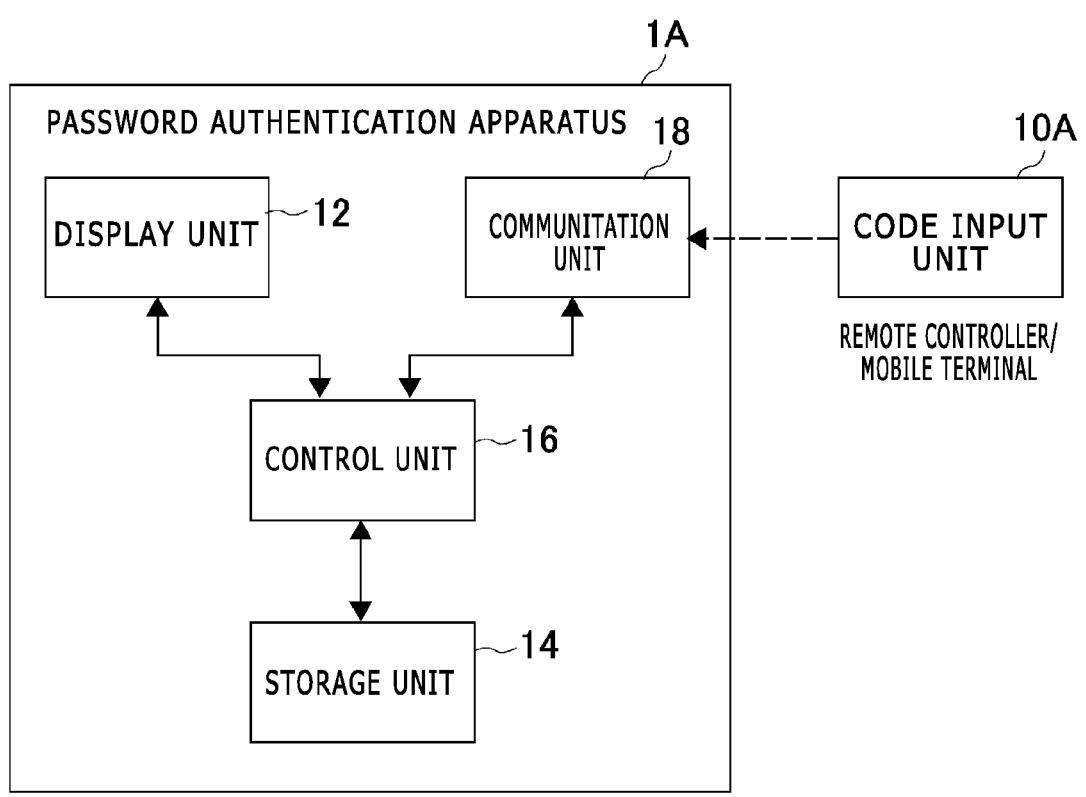
FIG. 12 is a block diagram showing a configuration of a password authentication apparatus of modification 3.

FIG. 12 is a block diagram showing a configuration of a password authentication apparatus according to modification 3. A code input unit 10A may be an external device not included in a set of a password authentication apparatus 1A according to the present modification 3. For example, the code input unit 10A may be a mobile terminal capable of communication via a communication line such as a wireless LAN and the Internet. Examples include a remote controller, smartphone, and tablet which communicate with the password authentication apparatus 1A by infrared rays or radio waves. A communication unit 18 is a device that, for example, receives a control signal transmitted from a remote controller by infrared rays or radio waves, or connects to a mobile terminal via a communication line to transmit and receive signals.

In the foregoing embodiment, colors are used as the patterns. Other patterns that are visually identifiable to the user, such as textures, characters, signs, and photos, may be used.

The password authentication apparatus and the password authentication method according to the foregoing embodiment are usable, for example, as means that is built in various electric equipment apparatuses such as an ATM (Automatic Teller Machine), a copying machine, a printing apparatus, a facsimile, a personal computer, a television set, a recording apparatus, and various types of vehicle equipment, and is intended to authenticate a user who has the authority to use services and functions thereof.

The invention claimed is:

1. A password authentication apparatus comprising:
   a processor;
   an input interface including a plurality of input keys to which respective unique codes are assigned and that are arranged in a specific layout;
   a display on which a plurality of pattern display areas to which for a respective plurality of patterns to be uniquely assigned at random are displayed as a pattern random array in a layout corresponding to the layout of the plurality of input keys in the input interface;
   a memory that stores a sequence of the patterns registered as a password of each user to be authenticated; and
   a controller that uniquely assigns the plurality of patterns to the plurality of pattern display areas at random and makes the display display the pattern random array, determines a shortest path to go through the sequence of the patterns serving as the password of the user to be authenticated in the pattern random array, replaces a sequence of all patterns existing on the shortest path with a sequence of the codes assigned to the respective plurality of input keys according to a correspondence relationship between the plurality of input keys and the plurality of pattern display areas to generate a one-time password, and compares the one-time password with a sequence of codes input by using the input interface to perform authentication; wherein
   the pattern random array is a two-dimensional array; and
   if there are a plurality of shortest paths to go through the sequence of the patterns serving as the password of the user to be authenticated in the pattern random array, the controller determines one shortest path to go through the sequence of the patterns according to priority between vertical and horizontal directions of the two-dimensional array.

2. The password authentication apparatus according to claim 1, wherein the patterns are colors.

3. A password authentication method comprising:
   preparing an input unit including a plurality of input keys to which respective unique codes are assigned and that are arranged in a specific layout, and a display unit on which a plurality of pattern display areas to which for a respective plurality of patterns to be uniquely assigned at random are displayed as a pattern random array in a layout corresponding to the layout of the plurality of input keys in the input unit;
   uniquely assigning the plurality of patterns to the plurality of pattern display areas at random and making the display unit display the pattern random array;
   determining a shortest path to go through a sequence of the patterns serving as a password of the user to be authenticated in the pattern random array; wherein the pattern random array is a two-dimensional array; and if there are a plurality of shortest paths to go through the sequence of the patterns serving as the password of the user to be authenticated in the pattern random array, determining one shortest path to go through the sequence of the patterns according to priority between vertical and horizontal directions of the two-dimensional array
   replacing a sequence of all patterns existing on the shortest path with a sequence of the codes assigned to the respective plurality of input keys according to a correspondence relationship between the plurality of input keys and the plurality of pattern display areas to generate a one-time password; and
   comparing the one-time password with a sequence of codes input by using the input unit to perform authentication.

4. A non-transitory computer-readable recording medium for storing a password authentication program, the password authentication program causing a computer to function as a control unit that,
   by using an input unit including a plurality of input keys to which respective unique codes are assigned and that are arranged in a specific layout, a display unit on which a plurality of pattern display areas to which for a respective plurality of types of patterns to be uniquely assigned at random are displayed as a pattern random array in a layout corresponding to the layout of the plurality of input keys in the input unit, and a storage unit that stores a sequence of the patterns registered as a password of each user to be authenticated,
   uniquely assigns the plurality of patterns to the plurality of pattern display areas at random and makes the display unit display the pattern random array, determines a shortest path to go through the sequence of the patterns serving as the password of the user to be authenticated in the pattern random array, replaces a sequence of all patterns existing on the shortest path with a sequence of the codes assigned to the respective plurality of input keys according to a correspondence relationship between the plurality of input keys and the plurality of pattern display areas to generate a one-time password, and compares the one-time password with a sequence of codes input by using the input unit to perform authentication; wherein the pattern random array is a two-dimensional array; and if there are a plurality of shortest paths to go through the sequence of the patterns serving as the password of the user to be authenticated in the pattern random array, the control unit determines one shortest path to go through the sequence of the patterns according to priority between vertical and horizontal directions of the two-dimensional array.

\* \* \* \* \*